United States Patent [19]

Kanmoto

[11] Patent Number: 4,523,229
[45] Date of Patent: Jun. 11, 1985

[54] SHADING CORRECTION DEVICE
[75] Inventor: Yoshiaki Kanmoto, Tokyo, Japan
[73] Assignee: Ricoh Company, Ltd., Japan
[21] Appl. No.: 388,679
[22] Filed: Jun. 15, 1982
[30] Foreign Application Priority Data
  Jun. 15, 1981 [JP] Japan .................................. 56-91689
[51] Int. Cl.³ .............................................. H04N 1/38
[52] U.S. Cl. .................................... 358/163; 358/284
[58] Field of Search ................. 358/163, 168, 169, 10, 358/284; 340/146.3 AG

[56] References Cited
U.S. PATENT DOCUMENTS
  4,314,281  2/1982  Wiggins ............................ 358/163
  4,354,243 10/1982  Ryan ................................ 358/163
  4,355,228 10/1982  Sama ................................ 358/163

FOREIGN PATENT DOCUMENTS
  158115 12/1979 Japan .................................. 358/163
   46621  4/1980 Japan .................................. 358/163
   79567  6/1980 Japan .................................. 358/163

Primary Examiner—Tommy P. Chin
Attorney, Agent, or Firm—Guy W. Shoup

[57] ABSTRACT

A device for carrying out the shading correction of an image signal is provided. The present device includes an image sensor capable of scanning a reference density reflecting plate over a predetermined number of times along different scanning lines and averaging means for taking an average among the repeated scannings thereby forming an error-free reference data to be later used in the operation of shading correction.

12 Claims, 5 Drawing Figures

SHADING CORRECTION DEVICE

BACKGROUND OF THE INVENTION

1. Field of the Invention

This invention relates to a shading correction device and in particular to a device for carrying out shading correction of image signals obtained from a solid-state image sensor.

2. Description of the Prior Art

A photoelectric reader for converting light information from an original document into electrical image signals using a solid-state image sensor is well known. In such a reader, it is required to correct the nonuniform characteristic of image signals attributable to lowering in the amount of peripheral light by an optical system for focusing the light reflected from the original document, nonuniformity in the amount of illuminating light, nonuniformity in the sensitivity of a solid-state image sensor such as a Charged Coupled Device (CCD), etc. Such a nonuniform characteristic of an image signal is commonly called "shading."

In order to carry out shading correction, it is common practice to use a reference density reflecting plate for detecting the shading amount of an image signal supplied from a solid-state image sensor such as a CCD. Then, using the level of an image signal obtained by receiving the light reflected from the reference density reflecting plate as a reference value, the level of an image signal obtained by scanning the original document is corrected to carry out shading correction. In this case, such a reference value must be highly accurate. Thus, in obtaining the reference value, care must be exercised not to introduce any error when scanning the reference density reflecting plate.

However, in a photoelectric reader employing a one-dimensional solid-state image sensor, it has conventionally been so structured that only a single line scanning is carried out to obtain the above-mentioned reference value. That is, the reference value was obtained by scanning a single line along the reference density reflecting plate. With such a structure, if there is a stain or a foreign matter such as debris, there will be formed a reference value which includes a large error. Moreover, when the scanning is to be carried out along a single line on the reference density reflecting plate, another large error may be introduced into the resulting reference value due to the differences in density along the reference density reflecting plate itself. It is extremely difficult to make a reference density reflecting plate which is uniform in density along its surface to a sufficient level not to produce an appreciable error in the reference value.

As described above, in accordance with the prior art shading correction device in which the reference correction value is obtained by a single line scanning, the resulting reference value itself is likely to include an error component, and, therefore, it is often the case with the prior art that a sufficient shading correction cannot be carried out no matter how accurately the correcting operation per se takes place.

SUMMARY OF THE INVENTION

The disadvantages of the prior art are overcome with the present invention and an improved shading correction device is provided.

Advantages of the present invention may be obtained preferably by providing a device for carrying out the shading correction of an image signal on the basis of a reference data obtained by scanning a reference density reflecting plate comprising: image sensing means for converting light image information into an electrical image signal, said image sensing means being capable of storing an accumulated charge by scanning along different lines on said reflecting plate thereby forming an expanded image signal when supplied as an output; control means for controlling the supply of an output from said image sensing means thereby determining whether the output from said image sensing means is an ordinary image signal or expanded image signal; averaging means for taking an average of said expanded image signal to form a reference data; and correction means for supplying a correction signal in response to said reference data.

Therefore it is an object of the present invention to provide a shading correction device which is not appreciably influenced by local irregularities of a reference density reflecting plate.

Another object of the present invention is to provide a device for carrying out the shading correction of an image signal with high accuracy.

A further object of the present invention is to provide a shading correction device which is relatively simple in structure and yet capable of providing an error-free reference data to be later used in the operation of shading correction.

Other objects, advantages and novel features of the present invention will become apparent from the following detailed description of the invention when considered in conjunction with the accompanying drawings.

DESCRIPTION OF THE PREFERRED EMBODIMENTS

Figure 1:
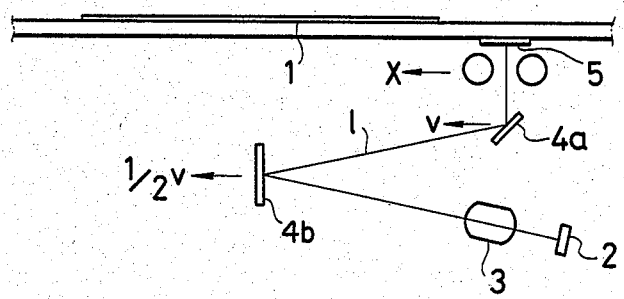
FIG. 1 is a schematic illustration showing one example of an image reading apparatus to which the present invention may be applied.
Figure 2:
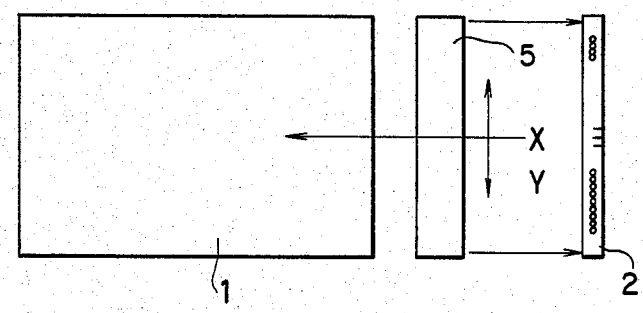
FIG. 2 is a plan view of the apparatus shown in FIG. 1.

FIGS. 1 and 2 schematically show the scanning type image reading apparatus to which the present invention is applied. As shown, the reading apparatus comprises a one-dimensional solid-state image sensor 2 which receives the light reflected from an original document 1 along the optical path indicated by the reference character l. Preferably, the image sensor 2 may be comprised of a Charge Coupled Device (CCD). Interposed between the original document 1 and the image sensor 2 is an optical system 3 which includes a lens 3 and a pair of moving mirrors 4a and 4b. As indicated by the arrows, the first and second moving mirrors 4a and 4b move with the velocities v and v/2, respectively, during scanning operation. Thus, the original document 1 is scanned in the direction indicated by the reference character X. In other words, the image sensor 2 is optically moved relative to the original document 1 in the direction indicated by X.

As best shown in FIG. 2, while the image sensor 2 is in optical relative motion in the direction X with respect to the original document 1, the image sensor 2 carries out scanning in the direction Y which is normal to the direction X, so that the two dimensional image on the original document 1 may be read by the one-dimensional image sensor 2 which includes a plurality of photoelectric elements arranged in a single line spaced apart from one another. Also provided is a reference density reflecting plate 5 for detecting the shading amount of an image signal supplied from the image sensor 2. The reflecting plate 5 is so disposed that it may be read prior to the initiation of scanning of the original document 1.

Figure 3:
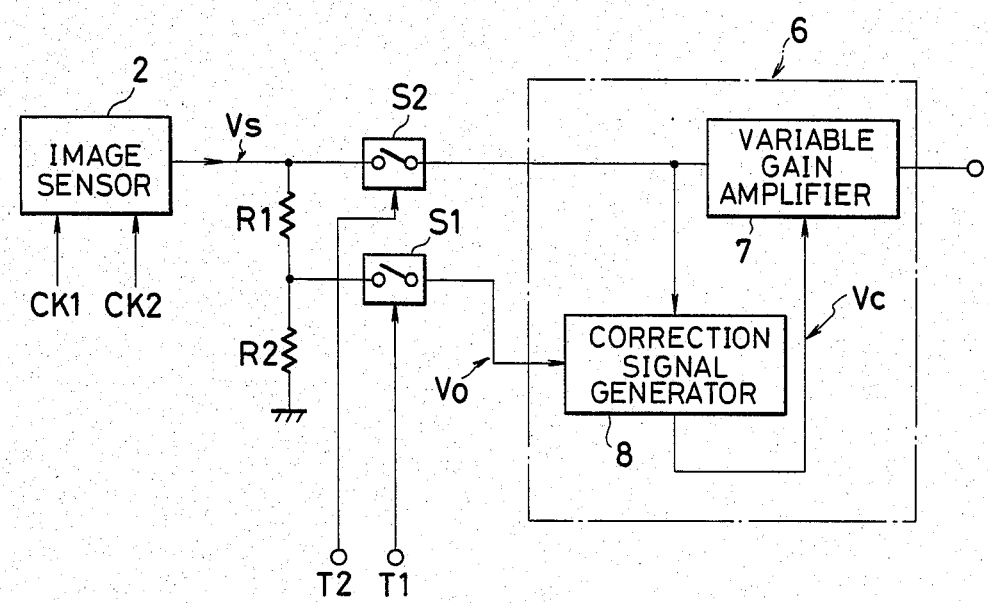
FIG. 3 is a block diagram showing the shading correction device embodying the present invention.

FIG. 3 shows one embodiment of the shading correction device in accordance with the present invention. As shown, the device comprises a correction circuit 6 which carries out the shading correction operation. The correction circuit 6 executes a correction operation on the basis of a reference or correction value which is previously determined prior to the initiation of scanning of the original document 1. Such a reference value is formed on the basis of the result obtained by reading or scanning the reference density reflecting plate 5. It is to be noted, however, that in accordance with the present invention, the image sensor 2 reads or scans the reference density reflecting plate 5 more than once and the reference value is determined by taking an average among a plurality of readings thus obtained.

Preferably, use may be made of a CCD for forming the image sensor 2 which carries out the required averaging operation, as will be described in detail hereinbelow. That is, in accordance with this embodiment, each of the photoelectric elements of the image sensor 2 accumulates the charge each time when the image sensor 2 scans the reference density reflecting plate 5. After repeating the reading of the reflecting plate 5 over a required number of times, the thus accumulated charge is supplied as an output from the image sensor 2.

In accordance with this embodiment of the present invention, there is also provided adjusting means for adjusting the level of the output signal comprised of the accumulated charge and supplied from the image sensor 2 to the level of an image signal obtained by a single scanning. In this manner, the output signal from the image sensor 2 is subjected to the level shift operation thereby forming the reference data to be used in the shading correction operation. In the embodiment shown in FIG. 3, such an adjusting means or a level shifter is simply formed by a voltage divider comprised of resistors R1 and R2.

In operation, in order to obtain the shading amount to be used in forming the reference data, a first analog switch S1 is turned on thereby the output $V_o$ from the voltage divider is supplied to the correction circuit 6. On the other hand, in order to read the original document 1, the image signal $V_S$ is directly supplied to the correction circuit 6 through a second analog switch S2. The first analog switch S1 is turned on by a timing signal T1 which is generated when the shading amount is to be read; whereas, the second analog switch S2 is turned on by a timing signal T2 which is generated when an original document is to be read.

Figure 4:
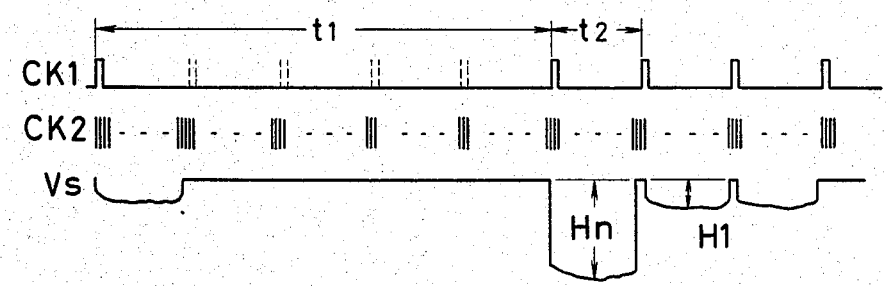
FIG. 4 is a timing chart useful for understanding the operation of the device shown in FIG. 3.

The image sensor 2 comprised of a CCD supplies as its output an image signal $V_S$ in response to transport clock CK1 and transfer clock CK2, one example of each of which is shown in FIG. 4. When the transport clock CK1 is supplied, the charges accumulated in the photoelectric elements of the CCD image sensor 2 are serially shifted out in synchronism with the transfer clock CK2. Such a shift output will form the image signal $V_S$. It is to be noted that in accordance with the present invention, the image sensor 2 supplies its output each time after a single horizontal scanning when the original document 1 is to be read; on the other hand, the image sensor 2 supplies its output only after repeating the horizontal scanning over a predetermined number of times when the shading amount is to be read.

Stated more in detail with reference to FIG. 4, when reading the shading amount, the electric charge accumulated in each of the photoelectric elements of the image sensor 2 is not released after a single horizontal scanning along the Y-direction; instead, each of the photoelectric elements stores or accumulates the charge produced during a predetermined period of time $t_1$ in which a predetermined number of scannings are carried out and then the thus accumulated charge is released during the next following scanning cycle or period $t_2$.

In this manner, in the case shown in FIG. 4, the scanning is repeated five times during the period $t_1$ and then the accumulated charge is supplied as an output during the next following scanning period $t_2$. As a result, the output level $H_n$ of the image signal $V_S$ is approximately five times larger than the output level H1 of an image signal $V_S$ which is obtained during the normal mode of operation in which the image signal $V_S$ is supplied each time after a single horizontal scanning. Such an expanded image signal $V_S$ which is approximately five times larger in level than a normal image signal $V_S$ is then supplied to the voltage divider comprised of resistors R1 and R2. By appropriately selecting the values of the resistors R1 and R2, the output from the voltage divider may be level-shifted to one fifth of an input thereby allowing to obtain an output $V_o$ averaged among the five scanning data. Then the required reference or correction value is determined on the basis of the averaged output $V_o$ thus obtained.

Therefore, even if an error source such as stain happens to exist along a single scanning line out of five as in the above embodiment, such an error will be diluted by the data of the remaining four scanning lines, so that the reference value is prevented from being significantly affected by such external disturbances. Moreover, even if nonuniformity in density exists on the reference density reflecting plate 5, such nonuniformity will be averaged out by carrying out a plurality of scannings along different lines. Thus, the reference value is less affected by the possible existence of nonuniformity in density on the reflecting plate 5 in the present invention as compared with the prior art in which only a single scanning line is used. It will now be appreciated that the present invention is capable of minimizing the influence of an error on a reference or correction value. Consequently, in accordance with the present invention, since the shading correction is carried out on the basis of such an errorfree reference value, a significantly improved and highly accurate correction may be obtained.

In the case where the width of a single scanning line is 125 μm, by repeating the scanning five times one line after another in a contiguous relationship, the total width covered will be 125 μm×5=625 μm and the reflection rate is averaged over this distance thereby allowing to obtain a reference value substantially free of error. The shading amount reading period $t_1$ is limited by the saturation level of the charge accumulated in the CCD image sensor 2. It should however be noted that such a period $t_1$ may be increased by adjusting the amount of illumination light directed to the reference density reflecting plate 5 or by increasing the density of the reflecting plate 5.

Figure 5:
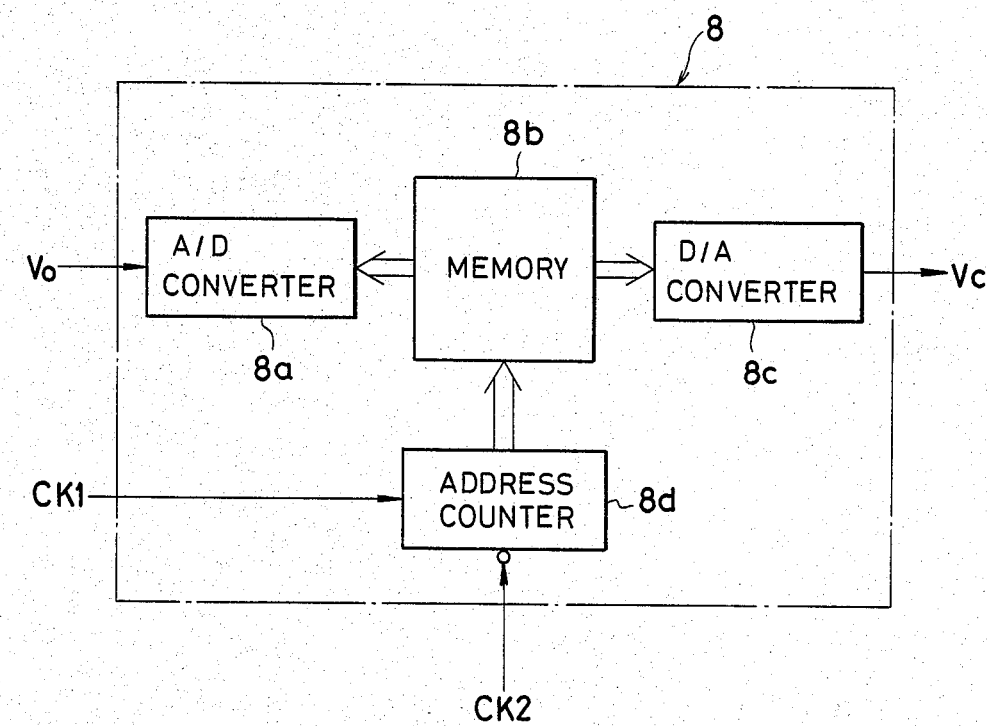
FIG. 5 is a block diagram showing the detailed structure of one example of the correction signal generator forming a part of the device shown in FIG. 4.

The correction circuit 6 typically comprises a variable gain amplifier 7 and a correction signal generator 8 which supplies a gain correction signal $V_C$ on the basis of the reference data obtained as described above, as shown in FIG. 3. Furthermore, as shown in FIG. 5, the correction signal generator 8 may be formed by comprising an analog-to-digital (A/D) converter 8a for converting the averaged output $V_o$ into digital representation, a random access memory (RAM) 8b for storing the output data from the converter 8a, a digital-to-analog (D/A) converter 8c for converting the data supplied from the memory 8b back into analog representation, and an address counter 8d which renews the address data of the memory 8b in synchronism with the read-out timing of each of the photoelectric elements of the image sensor 2. The address counter 8d is reset by the transport clock CK1 and thus the shading correction is carried out for each scanning. It is to be noted that since the averaged output $V_o$ is stored in the memory 8b as a reference or correction value in the form of digital representation, the shading correction thereafter can be carried out highly accurately without introduction of a large error.

As described above, the shading correction device of the present invention is so structured that a plurality of scannings are carried out along different scanning lines on the reference density reflecting plate to obtain an averaged reference data, and, therefore, the reference data obtained is prevented from being appreciably influenced by a local irregularity on the surface of the reference density reflecting plate such as stain or nonuniformity in density, which, in turn, allows to carry out the shading correction very accurately.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A device for carrying out the shading correction of an image signal on the basis of a reference data obtained by scanning a reference density reflecting plate comprising:
   image sensing means for converting light image information into an electrical image signal, said image sensing means being capable of storing an accumulated charge by scanning along different lines on said reflecting plate thereby forming an expanded image signal when supplied as an output;
   control means for controlling the supply of said output from said image sensing means is an ordinary image signal or said expanded image signal;
   averaging means for taking an average of said expanded image signal to form said reference data; and
   correction means for supplying a correction signal to be used in shading correction in response to said reference data.

2. The device of claim 1 wherein said image sensing means includes a Charge Coupled Device (CCD) provided with a plurality of photoelectric elements, each of which is capable of storing an accumulated charge.

3. The device of claim 1 wherein said plurality of photoelectric elements are arranged in a single line.

4. The device of claim 3 wherein said control means includes a first clock signal having a first clock period and a second clock signal having a second clock period, whereby said first clock period is long enough for the second clock signal to activate each of said photoelectric elements sequentially from one end to the other.

5. The device of claim 4 wherein when obtaining said expanded image signal, said first clock signal is repetitively applied to said image sensing means whereby the number of application of said first clock signal corresponds to the number of different scanning lines on said reflecting plate.

6. The device of claim 1 wherein said averaging means includes a voltage divider comprised of a first resistor having a first resistance and a second resistor having a second resistance whereby the ratio of said first resistance to second resistance is determined in accordance with the number of different scanning lines.

7. The device of claim 1 wherein said correction means includes an analog-to-digital converter which receives said reference data and converts it into digital representation, a random access memory for storing the digitized average value as the reference data, and a digital-to-analog converter which receives the digitized average value and converts back into analog representation thereby forming the correction signal.

8. The device of claim 7 wherein said correction means further includes a variable gain amplifier for amplifying said electrical image signal, the gain of said amplifier being variably set depending on the correction signal supplied thereto.

9. The device of claim 1 wherein said control means includes switching means interposed between said averaging means and said correction means, said switching means having two modes: first mode in which said reference data is supplied to said correction means and a second mode in which said ordinary image signal is directly supplied to said correction means by bypassing said averaging means.

10. The device of claim 9 wherein said switching means includes a pair of switches: a first switch connected between the input of said averaging means and a first input terminal of said correction means and a second switch connected between the output of said averaging means and a second input terminal of said correction means, whereby said first and second switches are selectively operated.

11. The device of claim 10 wherein said correction means includes a variable gain amplifier having its input connected to said first input terminal with its output connected to an output terminal of said correction means and a correction signal generator having its input connected to said second input terminal, said correction signal generator supplying the correction signal to said variable gain amplifier in response to said image signal when said first switch is on and said second switch is off.

12. A method for carrying out the shading correction of an image signal supplied from a one-dimensional solid-state sensor which receives the light reflected from an original document to be read through an optical system, said image sensor being optically moved relative to said original document while scanning in the direction perpendicular to the direction of optical relative motion between said image sensor and original document, said method comprising the steps of:

scanning a reference density reflecting plate by said image sensor over a predetermined number of times along different scanning lines on said plate thereby accumulating image data in said image sensor;

taking an average of said image data accumulated in said image sensor to define a reference data; and carrying out a shading correction operation on the basis of said reference data.

* * * * *